US008392951B2

(12) United States Patent
Park et al.

(10) Patent No.: US 8,392,951 B2
(45) Date of Patent: Mar. 5, 2013

(54) INFORMATION PROVIDING APPARATUS AND METHOD THEREOF

(75) Inventors: Il-Yong Park, Gyeonggi-Do (KR);
Seong-Pyo Hong, Gyeonggi-Do (KR);
Jae-Ho Na, Seoul (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 12/814,318

(22) Filed: Jun. 11, 2010

(65) Prior Publication Data
US 2011/0181779 A1 Jul. 28, 2011

(30) Foreign Application Priority Data

Jan. 26, 2010 (KR) .................. 10-2010-0007146

(51) Int. Cl.
*H04N 21/478* (2011.01)
*H04N 21/458* (2011.01)
*G06K 9/00* (2006.01)
*G06K 9/36* (2006.01)

(52) U.S. Cl. ............. 725/60; 725/32; 382/100; 382/286

(58) Field of Classification Search ........................ None
See application file for complete search history.

(56) References Cited

U.S. PATENT DOCUMENTS

| 7,752,642 | B2 * | 7/2010 | Lemmons ....................... 725/32 |
| 2007/0060112 | A1 * | 3/2007 | Reimer ...................... 455/414.2 |
| 2008/0226119 | A1 * | 9/2008 | Candelore et al. ............ 382/100 |
| 2009/0018898 | A1 * | 1/2009 | Genen ............................. 705/10 |
| 2010/0303440 | A1 * | 12/2010 | Lin et al. ....................... 386/241 |

* cited by examiner

*Primary Examiner* — Kristine Kincaid
*Assistant Examiner* — Oschta Montoya
(74) *Attorney, Agent, or Firm* — Birch, Stewart, Kolasch & Birch, LLP

(57) ABSTRACT

A mobile terminal including a communication unit configured to communicate with an external server associated with the mobile terminal; a display unit configured to display a video; and a controller configured to receive a detection request signal requesting an object in the video be detected, to detect the object in the video upon receiving the detection request signal, to retrieve history timing information about when the object was detected in the displayed video, and to display the history timing information on the display unit.

22 Claims, 10 Drawing Sheets

INFORMATION PROVIDING APPARATUS AND METHOD THEREOF

CROSS-REFERENCE TO A RELATED APPLICATION

This application claims priority to Korean Patent Application No. 10-2010-0007146 filed on Jan. 26, 2010, in the Republic of Korea, the entire contents of which is hereby incorporated by reference in its entirety.

BACKGROUND OF THE INVENTION

1. Field of the Invention

The present invention relates to an information providing apparatus and corresponding method.

2. Description of the Related Art

A related art information, providing apparatus is applied in various devices such as a mobile terminal, a notebook computer, a television, and the like. The information providing apparatus provides a plurality of information to users of the devices such as television broadcast programs, voice information, and the like. However, the information provided to the user is limited in nature.

SUMMARY OF THE INVENTION

Accordingly, one object of the present invention is to address the above-noted and other problems of the related art.

Another object of the present invention is to detect objects within a displayed video and provide a plurality of information about the detected objects to a user.

To achieve these and other advantages and in accordance with the purpose of the present invention, as embodied and broadly described herein, the present invention provides in one aspect a mobile terminal including a communication unit configured to communicate with an external server associated with the mobile terminal; a display unit configured to display a video; and a controller configured to receive a detection request signal requesting an object in the video be detected, to detect the object in the video upon receiving the detection request signal, to retrieve history timing information about when the object was detected, in the displayed video, and to display the history timing information on the display unit.

In another aspect, the present invention provides a method of controlling a mobile terminal, and which includes communicating, via a communication unit, with an external server associated with the mobile terminal; displaying, via a display unit, a video; receiving, via a controller, a detection request signal requesting an object in the video be detected; detecting, via the controller, the object, in the video upon receiving the detection request signal, and retrieving history timing information about when the object was detected in the displayed video, and displaying, via the controller, the history timing information on the display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
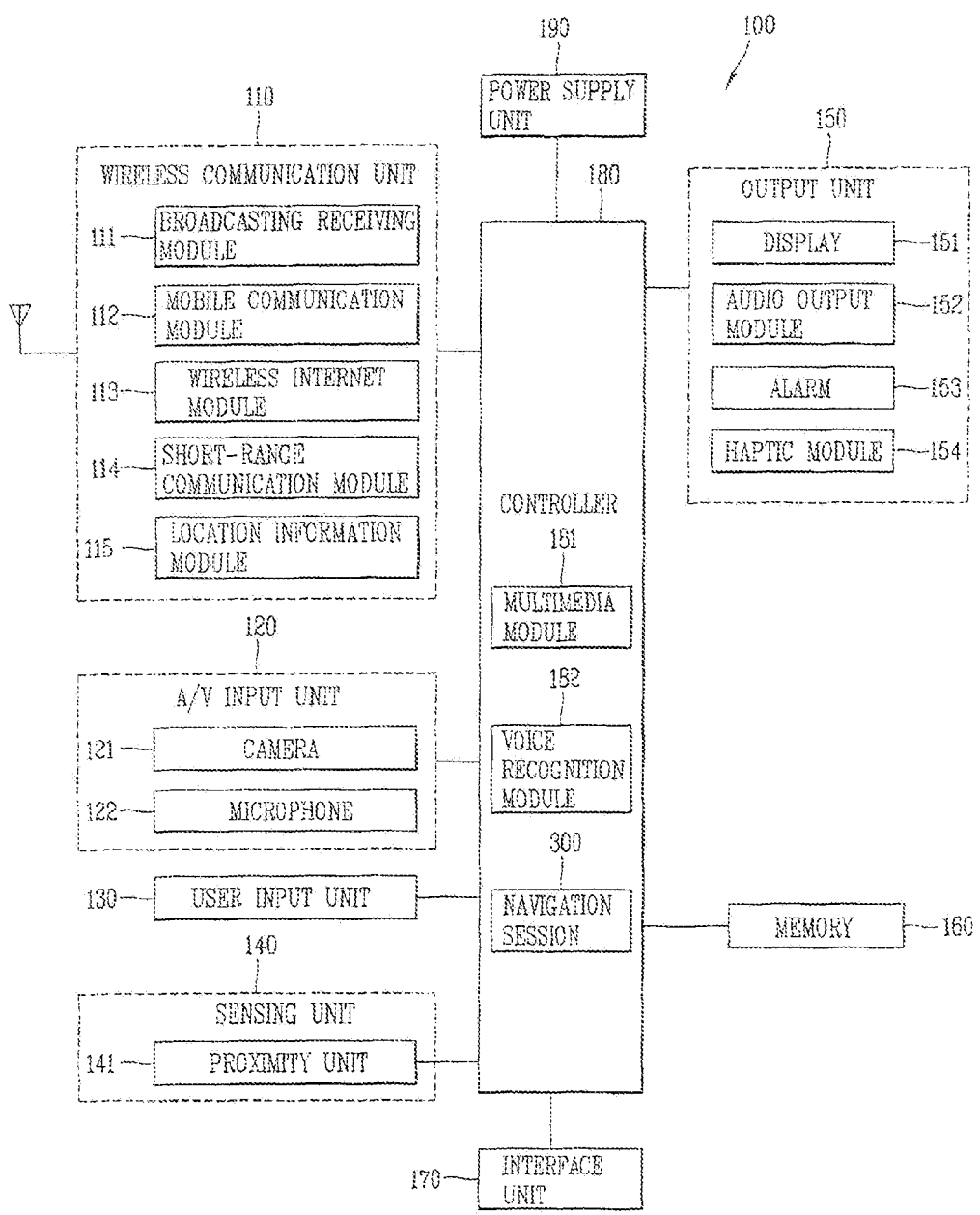
FIG. 1 is a block diagram of a mobile communication terminal including an information providing apparatus according to an embodiment of the present invention.

In more detail, FIG. 1 is a block diagram illustrating a mobile communication terminal 100 according to an embodiment of the present invention. Further, the mobile terminal (e.g., mobile phone) 100 may be implemented in various forms. For example, the mobile communication terminal 100 can be a portable phone, smart phone, notebook computer, digital broadcast receiver, personal digital assistant (PDA), portable multimedia player (PMP), and the like.

In the embodiment in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, a power supply unit 190, and the like. The mobile communication terminal 100 may be implemented with greater or less elements than the elements as illustrated in FIG. 1.

Further, the wireless communication unit 110 includes one or more elements allowing radio communication between the mobile communication terminal 100 and a wireless communication system, or allowing radio communication between the mobile communication terminal 100 and a network in which the mobile communication terminal 100 is located. For example, in FIG. 1, the wireless communication unit 110 includes a broadcast receiving module 111, a mobile communication module 112, a wireless Internet module 113, a short-range communication module, 114, a location information module 115, and the like.

In more detail, the broadcast receiving module 111 receives broadcast signals and/or broadcast associated information from an external broadcast management server through a broadcast channel. The broadcast channel may include a satellite channel and/or a terrestrial channel. In addition, the broadcast management server corresponds to a server that generates and transmits a broadcast signal and/or broadcast associated information or a server that receives a previously generated broadcast signal and/or broadcast associated information and transmits the information to the mobile communication terminal 100. The broadcast associated information also corresponds to information regarding a broadcast channel, a broadcast program, a broadcast service provider, and the like. Also, the broadcast signal may include a TV broadcast signal, a radio broadcast signal and a data broadcast signal as well as a broadcast signal in a form that a data broadcast signal is combined with the TV or radio broadcast signal.

Further, the broadcast associated information may also be provided through a mobile communication network, and in this instance, the broadcast associated information may be received by the mobile communication module 112. The broadcast signal may also exist in various fonts such as in the form of an electronic program guide (EPG) of the digital multimedia broadcasting (DMB) system, an electronic service guide (ESG) of the digital video broadcast handheld (DVB-H) system, and the like.

In addition, the broadcast receiving module 111 can receive a broadcast signal using various types of broadcast systems. In particular, the broadcast receiving module 111 can receive a digital broadcast signal using a digital broadcast system such as the digital Multimedia broadcasting-terrestrial (DMB-T) system, the digital multimedia broadcasting satellite (DMB-S) system, the media forward link only (MediaFLO), system, the digital video broadcast-handheld (DVB-H) system, the integrated services digital broadcast-terrestrial (ISDB-T) systems and the like. The broadcast receiving module 111 can also be configured to be suitable for all broadcast systems that provide a broadcast signal as well as the above-mentioned digital broadcast systems. The broadcast signal and/or broadcast-associated information received through the broadcast receiving module 111 can also be stored in the memory 160.

Further, the mobile communication module 112 transmits and/or receives a radio signal to and/or from at least one of a base station, an external terminal and a server over a mobile communication network. The radio signal may include a voice Call signal, a video call signal and/or various types of data according to text and/or multimedia message transmission and/or reception. In addition, the wireless Internet module 113 corresponds to a module for supporting wireless Internet access and can be built-in or externally installed to the mobile communication terminal 100. A wireless Internet access technique including a WLAN (Wireless LAN), Wi-Fi, Wibro (Wireless Broadband), Wimax (World Interoperability for Microwave Access), HSDPA (High Speed Downlink Packet Access), and the like can also be used.

In addition, the short-range communication module 114 corresponds to a module for Supporting a short-range communication. For example, a short-range communication technology including Bluetooth, Radio Frequency IDentification (RFID), Infrared Data Association (IrDA), Ultra WideBand (UWB), ZigBee, and the like can be used. Further, the location information module 115 is a module for checking or acquiring a location of the mobile terminal and a GPS module is an example. In more detail, the GPS module receives location information from a plurality of satellites in which the location information may include coordinate information represented by latitude and longitude values, For example, the GPS module can measure an accurate time and distance from three or more satellites, and accurately calculate a current location according to trigonometry based upon three different distances. A method of acquiring distance and time information from three satellites and performing error correction with a single satellite can also be used. In particular, the GPS module can acquire an accurate time together with three-dimensional speed information as well as the location of the latitude, longitude and altitude values from the location information received from the satellites. For the location information module 115, a Wi-Fi positioning system and/or a hybrid positioning system may be applicable.

In addition, the A/V (audio/video) input unit 120 receives an audio or video signal, and in FIG. 1 includes a camera 121 and a microphone 122. The camera 121 processes an image frame such as still picture or video obtained by an image sensor in a video phone call or image capturing mode. The processed image frames can also be displayed on a display unit 151 and be stored in the memory 160 (or other storage medium) or transmitted through the wireless communication unit 110. Two or more cameras 121 can also be provided according to the configuration type and/or use environment of the mobile terminal 100.

Further, the microphone 122 receives an external audio signal in a phone call mode, a recording mode, a voice recognition mode, and the like, and processes the audio signal into electrical voice data. The processed voice data is then converted and output into a format that is transmittable to a mobile communication base station through the mobile communication module 112 in the phone call mode. The microphone 122 may also implement various types of noise canceling algorithms to cancel noise generated in a procedure of receiving the external audio signal.

In addition, the user input unit 130 can generate input data to control an operation of the mobile terminal 100. The user input unit 130 may also be configured by including a keypad, a dome switch, a touch pad (pressure/capacitance), a jog wheel, a jog switch, and the like. Particularly, when the touch pad forms an interlayer structure together with the display unit 151, it may be called a touch screen.

The sensing unit 140 detects a current status of the mobile terminal 100 such as an opened or closed state of the mobile terminal 100, a location of the mobile terminal 100, the presence or absence of user contact, an orientation of the mobile terminal 100, an acceleration or deceleration movement of the mobile terminal 100, and the like, and generates a sensing signal for controlling the operation of the mobile terminal 100. For example, when the mobile terminal 100 is a slide phone type, the sensing unit 140 can sense eh opened or closed state of the slide phone. Furthermore, the sensing unit 140 includes a sensing function for determining whether or not power is supplied from the power supply unit 190, and Whether or not an external device is coupled with the interface unit 170.

In addition, the interface unit, 170 performs a role of interfacing with external devices connected to the mobile communication terminal 100. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. Here, the identification module may be configured as a chip for storing various information required to authenticate an authority for using the mobile communication terminal 100, which may include a User Identity Module (UIM), a Subscriber Identity Module (SIM), a Universal. Subscriber Identity Module (USIM), and the like.

Also, the device provided with the identification module (hereinafter, referred to as 'identification device') may be implemented in the type of a smart card. Hence, the identification device can be coupled to the mobile communication terminal 100 via a port. The interface unit 170 can also receive data or power from an external device and transfer the received data or power to each element in the mobile terminal 100, or transmit data within the mobile terminal 100 to the external device.

In addition, the output unit 150 is configured to provide an output for audio signal, video signal, or alarm signal, and in FIG. 1, includes the display unit 151 (labeled "display" in FIG. 1), an audio output module 152, an alarm unit 153, a haptic module 154, and the like. The display unit 151 can display or output information processed in the mobile terminal 100. For example, when the mobile, terminal 100 is in a phone call mode, the display unit 151 can display a User Interface (UI) or a Graphic User Interface (GUI) associated with a call. When the mobile terminal 100 is in a video call mode or image capturing mode, the display unit 151 can display a captured image and/or received image, a UI or GUI.

Further, the display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display. Two or more display units 151 may also be provided. For example, an external display unit and an internal display unit can be simultaneously provided in the mobile terminal 100. Meanwhile, when the display unit 151 and a sensor for detecting a touch operation (hereinafter, 'touch sensor') are formed with an interlayer structure (hereinafter, 'touch screen'), the display unit 151 can be also used as an input device in addition to an output device. The touch sensor can also be configured in a form of, for example, touch film, touch sheet, touch pad, or the like.

Furthermore, the touch sensor can be configured to convert a change such as pressure applied to a specific area of the display unit 151 or capacitance generated on a specific area of the display unit 151 into an electrical input signal. The touch sensor can also be configured to detect a touch input pressure as well as a touch input position and a touch input area. When there is a touch input to the touch sensor, a signal (or signals) corresponding to the touch input is sent to a touch controller. The touch controller then processes the signal (or signals) and sends the corresponding data to a controller 180. Thus, the controller 180 can determine Whether or not any region is touched on the display unit 151.

Figure 2:
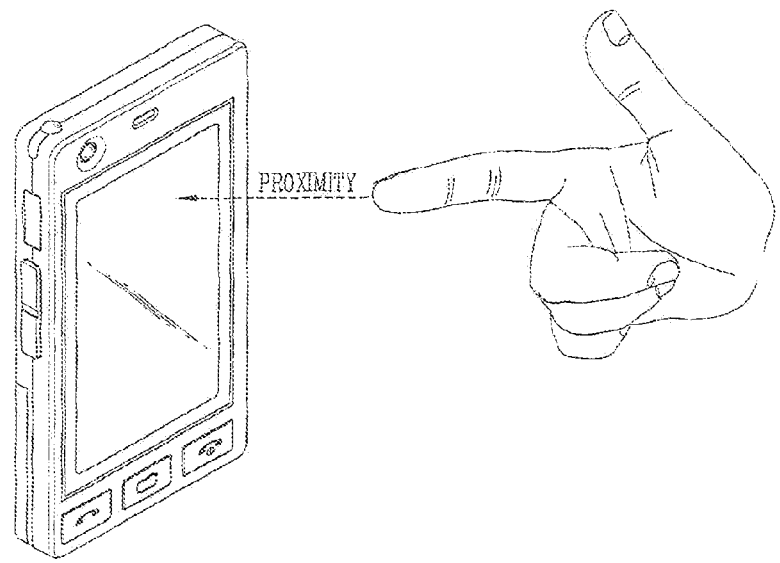
FIG. 2 is an overview illustrating a proximity touch operation on a mobile communication terminal according to an embodiment of the present invention.

Hereinafter, a proximity sensor 141 included in the sensing unit 140 in FIG. 1 will be described with reference to FIG. 2. In more detail, FIG. 2 is an overview illustrating a proximity-touch process for the mobile terminal 100. In an embodiment of the present invention, a proximity-touch means a state that a pointer approaches to a screen while being apart a predetermined distance from the screen without actually touching the screen.

The proximity sensor 141 can also be arranged in an inner region of the mobile terminal 100 surrounded by a touch screen or be arranged adjacent to the touch screen further, the proximity sensor 141 is a sensor for detecting the presence or absence of an object approaching to a certain detection surface or an object that exists nearby using the force of electromagnetism or infrared rays without a mechanical contact. Thus the proximity sensor 141 has a considerably longer life span compared with a contact, type sensor, and can be utilized for various purposes.

Examples, of the proximity sensor 141 include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. When the touch screen is an electrostatic type, the approach of a pointer can be detected based on a change in a field according to the approach of the pointer. In this instance, the touch screen (touch sensor) may be classified as a proximity sensor.

In the following description, for the sake of brevity, recognition of the pointer positioned to be close to the touch screen, although the pointer is not actually brought into contact with the touch screen, will be called a "proximity touch," while recognition of actual contacting of the pointer on the touch screen will be called a "contact touch." The position where the pointer is proximately touched on the touch screen means a position where the pointer is positioned to correspond vertically to the touch screen when the pointer is proximately touched.

Furthermore, the proximity sensor 141 can detect a proximity touch, and a proximity touch pattern (for example, a proximity touch distance, a proximity touch direction, a proximity touch speed, a proximity touch time, a proximity touch position, a proximity touch movement state, or the like). Information corresponding to the detected proximity touch operation and the proximity touch pattern can also be output to the touch screen.

Returning to FIG. 1, the audio output module 152 can output audio data received from the wireless communication unit 110 or stored in the memory 160 in a call signal reception mode, a call mode, a record mode, a voice recognition mode, a broadcast reception mode, and the like. Also, the audio output module 152 can output an audio signal associated with the function performed by the mobile terminal 100 (for example, a call signal reception sound, a message reception sound, etc.). The audio output module 152 may include a receiver, a speaker, a buzzer, and the like.

In addition, the alarm unit 153 can also output a signal to notify a user of the terminal 100 about the occurrence of an event of the mobile terminal 100. Examples of the event occurring in the mobile terminal 100 include a call signal reception, message reception, a key signal input, a touch input, and the like. In addition to an audio or video output, the alarm unit 153 can also output a signal in a different manner to notify the user about the occurrence of an event. For example, the alarm unit 153 can output in a form of vibration. In addition, when a call signal or message is received, the alarm unit 153 can vibrate the mobile terminal 100 through vibration mechanisms.

Also, when a key signal is input, the alarm unit 153 can vibrate the mobile terminal 100 through vibration mechanisms using a feedback to the key signal input. The user can thus recognize an occurrence of the through vibration as described above. The signal for notifying an occurrence of the event can also be output through the display unit 151 or the audio output module 152.

In addition, the haptic module 154 generates various tactile effects felt by the user. A typical example of the tactile effects generated by the haptic module 154 is vibration. The intensity, pattern, or the like, generated by the haptic module 154 can also be controlled. For example, different vibrations may be combined and output or sequentially output. The haptic module 154, in addition to vibration, can generate various tactile effects including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device.

The haptic module 154 can also be implemented, to feel a tactile effect through muscular senses by a finger or arm of the user as well as to transfer a tactile effect through direct contact. Two or more haptic modules 154 can alto be provided. In addition, the haptic module 154 may be provided at a place frequently contacted by the user in a vehicle such as on a steering wheel, a gearshift lever, a seat, or the like.

Further, the memory 160 can store software programs for processing and controlling the controller 180, or temporarily store data (for example, phonebook, message, still image, video, and the like) that are input and/or output. The memory 160 may include at least one type of storage medium including a Flash memory type, a hard disk type, a multimedia card Micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM) magnetic memory, a magnetic disk, an optical disk, and the like. Also, the mobile terminal 100 can run a web storage that performs the storage function of the memory 160 over the Internet, or operate in association with the web storage.

In addition, the interface unit 170 serves as an interface to external devices that may be connected with the mobile terminal 100. For example, the interface unit 170 may include a wired or wireless headset port, an external battery charger port, a wired or wireless data port, a memory card port, a ports for connecting a device having an identification module, an audio input/output (I/O) port, an video input/output (I/O) port, an earphone port, and the like. As discussed above, the identification module, as a chip that stores various information for authenticating the authority to use the mobile terminal 100, may include a user identity module (UIM), a subscriber identity module (SIM), a universal subscriber identity module (USIM), and the like. In addition, the device having the identification module ('identifying device') may be made in a form of smart card. Accordingly, the identifying device may be connected with the mobile terminal 100 through a port. The interface unit 170 can also receive data or power from an external device and transfer the received data or power to each element within the mobile terminal 100 or may be used to transfer data within the mobile terminal 100 to an external device.

Further, when the mobile terminal 100 is connected with an external cradle, the interface unit 170 can serve as a conduit to allow power from the cradle to be supplied therethrough to the mobile terminal 100 or can serve as a conduit to allow various command signals input from the cradle to be transferred to the mobile terminal 100 therethrough. Various command signals or the power input from the cradle can also operate as a signal for recognizing when the mobile terminal 100 is properly mounted on the cradle.

In addition, the controller 180 also controls a general operation of the mobile terminal 100. For example, the controller 180 performs a control and processing operation associated with a voice call, a data communication, a video phone call, and the like. In addition, in FIG. 1, the controller 180 includes a multimedia module 181 for reproducing multimedia content. The multimedia module 181 may also be provided within the controller 180 or be separately provided from the controller 180. The controller 180 can also perform a pattern recognition processing to recognize a handwriting or picture-drawing input performed on the touch screen as a character or image, respectively. Further, the power supply unit 190 receives external or internal power to supply the power required for an operation of each element under a control of the controller 180.

Also, the function of an element applied to the mobile terminal 100 may be implemented in a computer-readable medium using software, hardware, or any combination thereof. For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180.

For a software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

The controller 180 also includes a voice recognition module 182 that recognizes a voice from a user, and performs a relevant function based on the recognized voice signal. A navigation session 300 applied to the mobile terminal 100 is also included within the controller 180 and displays a travel path on data map. The navigation session 300 can also be separate from the controller 180.

Figure 3:
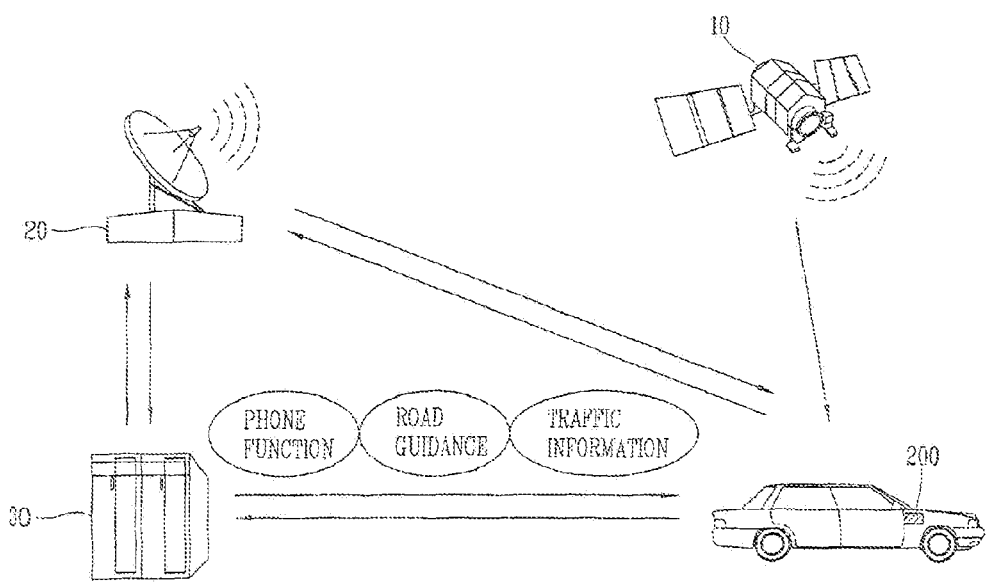
FIG. 3 is block diagram of a vehicle navigation system according to an embodiment of the present invention.

Next, FIG. 3 is a block diagram illustrating a vehicle navigation system according to an embodiment of the present invention. As illustrated in FIG. 3, the vehicle navigation system may be configured by including an information providing center 30 for providing traffic information and various data (for example, programs, execution files, etc.), and a telematics terminal 200 mounted within a vehicle for receiving traffic information through a long-range wireless communication network 20 and/of a short-range wireless communication network, and providing a road guide service based on a GPS signal received through a satellite 10 and the traffic information. Here, the communication network may further include a wired/wireless communication network such as local area network (LAN), wide area network (WAN), and the like.

Various kinds of traffic information (for example, road traffic information, information on points of interest) including traffic light information are collected over the communication network, and the collected information is processed according to the transport protocol expert group (TPEG) specification in the information providing center 30 (for example, a server) and transmitted to a broadcasting station. Accordingly, the broadcasting station inserts traffic information including traffic light information into a broadcast signal and broadcasts the broadcast signal to the telematics terminal 200 included in the vehicle.

In addition, the server 30 processes various kinds of traffic information collected via several paths connected to the communication network such as the input of an operator, wired/wireless Internet, a transparent data channel (TDC), digital broadcasting service such as multimedia object transport (MOC), other servers, and probe cars. The server also reconfigures the collected traffic information according to a traffic information format, for example, a format according to the transport protocol expert group (TPEG) specification, which is a specification for traffic information services and transmits The reconfigured information to a broadcasting station.

The server 30 can also generate a traffic information format of the TPEG specification including traffic light information and transmit the generated format to a broadcasting station. Further, the broadcasting station loads the traffic information including traffic light information received from the server on a broadcast signal and transmits the broadcast signal in a wireless manner such that a traffic information receiving terminal, for example, a navigation device, mounted in the vehicle, and the like, can receive the traffic information. The traffic information includes traffic light information and additionally may include information on various traffic conditions required for road, marine, and aviation services such as accidents, road conditions, traffic congestions, road constructions, closed roads, delay of public transport networks, and delay of aviation operations.

In addition, the broadcasting station receives traffic information processed by the server 30 and transmits the traffic information to the telematics terminal 200 through a digital signal according to various digital broadcasting specifications. For example, the broadcasting specifications may include a variety of digital broadcasting specifications such as Eureka 147 (ETSI EN 300 401) based on the European digital audio broadcasting (DAB) specification, the terrestrial or satellite digital multimedia broadcasting (DMB) specification, the terrestrial digital video broadcasting (DVB-T) specification, the digital video broadcasting-handheld (DVB-H) specification, and the media forward link only (MFLO) specification.

The broadcasting station can also transmit the traffic information including traffic light information over wired/wireless networks such as wired/wireless Internet. In addition, the vehicle including the telematics terminal 200 includes all kinds of carriers being implemented using mechanical and/or electronic devices for the purpose of carrying people or things such as general passenger cars, buses, trains, ships, and airplanes. Further, the vehicle is mounted with a traffic information receiving terminal (e.g., the telematics terminal 200) to receive traffic light information from the broadcasting station using the mounted traffic information receiving terminal, processes the traffic light information, and delivers the processed traffic light information to the user through graphics, texts and/or audios.

Figure 4:
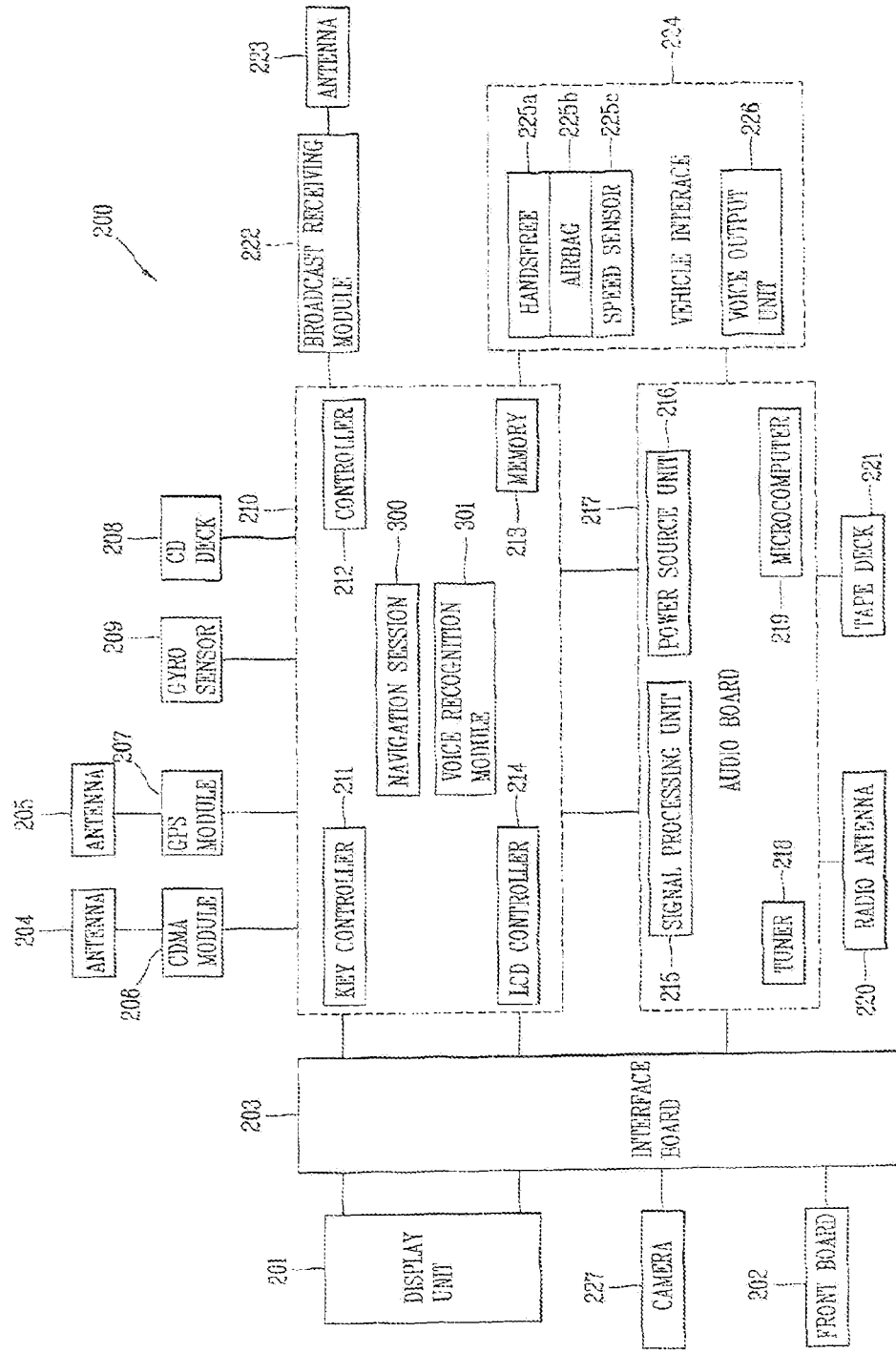
FIG. 4 is a block diagram illustrating a telematics terminal including an information providing apparatus according to an embodiment of the present invention.

Next, FIG. 4 is a block diagram illustrating the telematics terminal 200 according to an embodiment of the present invention. As illustrated in FIG. 4, the telematics terminal 200 includes a central processing unit (CPU) or controller 212 for performing an overall control of the telematics terminal 200, a memory 213 for storing a variety of information, a key controller 211 for controlling a variety of key signals, and a main board 210 having an LCD controller 214 for controlling an liquid crystal display device (LCD) therein.

Further, the memory 213 stores map information (map data) for displaying road guide information on a digital map, and stores, information for an algorithm of controlling traffic information collection to allow an input of traffic information depending on a road condition in which a vehicle is currently traveling, and for controlling the algorithm.

In addition, the main board 210 includes a code division multiple access (CDMA) module 206 serving as a mobile communication module and has a unique device number, a GPS module 207 for receiving a GPS signal to guide a location of a vehicle, track a traveling path from a departure to a destination, etc., and for transmitting traffic information collected by the user as a global positioning system (GPS) signal, a CD deck 208 for reproducing a signal recorded on a compact disk (CD), a gyro sensor 209, and the like. The CDMA module 206 and the. GPS module 207 are also configured to transmit and receive a signal through antennas 204 and 205.

In addition, a broadcast receiving module 222 is connected to the main board 210 and receives broadcast signals through an antenna 223. The main board 210 is connected via an interface board 203 to a display unit (LCD) 201 controlled by the LCD controller 214, a front board 202 controlled by the key controller 211, and a camera 227 for capturing an inside and/or outside of the vehicle. The display unit 201 also displays a variety of video signals and text signals, and the front board 202 includes buttons for allowing an input of a variety of key signals so as to provide a key signal corresponding to a button selected by the user to the main board 210. In addition, the display unit 201 includes the proximity sensor 141 and a touch sensor (touch screen) of FIG. 2.

Further, the front board 202 includes a menu key for allowing a direct input of traffic information, and the menu key may be configured to be controlled by the key controller 211. The audio board 217 is also connected to the main board 210 and processes a variety of audio signals. In FIG. 4, the audio board 217 includes a microcomputer 219 for controlling the audio board 217, a tuner 218 for receiving a radio signal, a power unit 216 for supplying power to the microcomputer 219, and a signal processing unit 215 for processing a variety of voice signals.

In addition, the audio board 217 includes a radio antenna 220 for receiving a radio signal and a tape deck 221 for reproducing an audio tape. The audio board 217 also includes an audio/voice output unit, (amplifier) 226 for outputting a voice signal processed by the audio board 217. Further, the audio output unit (amplifier) 226 is connected to a vehicle interface 224. In other words, the audio board 217 and the main board 210 are connected to the vehicle interface 224. A hands-free unit 225a for inputting a voice signal, an airbag 225b for passenger safety, a speed sensor 225c for detecting a vehicle speed and the like are connected to the vehicle interface 224. Also, the speed sensor 225c calculates a vehicle speed, and provides the calculated vehicle speed information to the central processing unit 212.

Further, the mobile vehicle navigation session 300 applied to the telematics terminal 200 generates road guide information based on map data and current vehicle location information, and notifies the generated road guide information to the user. Also, the display unit 201 senses a proximity touch within the display window through the proximity sensor 141. For example, when a pointer (for example, finger or stylus pen) is proximity-touched, the display unit 201 detects the position of the proximity touch, and outputs position information corresponding to the detected position to the controller 212.

In addition, the voice recognition device (or voice recognition module) 301 recognizes a user's voice, and performs a relevant function based on the recognized voice signal. The navigation session 300 applied to the mobile communication terminal 200 also displays a travel path on map data, and automatically forms a wireless network together with a terminal (for example, vehicle navigation device) mounted on a neighboring vehicle and/or a mobile communication terminal carried by a neighboring pedestrian through a wireless communication (for example, short-range wireless communication network) when the location of the mobile communication terminal 100 is within a predetermined distance from a dead zone included in the travel path. Thus, the session 300 can receive the location information of the neighboring vehicle from the terminal mounted on the neighboring vehicle, and receive the location information of the neighboring pedestrian from the mobile communication terminal carried by the neighboring pedestrian.

In addition, the information providing apparatus applied to the telematics terminal 200 includes the display unit 201 for displaying video, and the controller 212 for detecting an object in the video and providing information regarding the detected object. The controller 212 also displays history information of the objects within the video on the display unit 201. Further, the object may be an image area selected from the displayed video, and the object history information may include a video reproduction time bar, summary information regarding the video, a reproduction (display) time point of the detected object, etc. Also, the object history information may further include the detected object.

In addition, the controller 212 can display an icon indicating a reproduction time point of the detected object at the video reproduction time bar. Also, when an input for searching for an object is received, the controller 212 can capture the video to display a still image of the video on the display unit 201, detect an object within the still image, and display information regarding the detected object on the display unit 201. The controller 212 can also recognize a motion within the video, capture one or more still images according to the recognized motion and display the one or more captured still images on the display unit 201.

Further, the controller 212 can recognize a motion within the video, capture a plurality of still images according to the recognized motion, divide the screen image of the display unit 201 into a plurality of sections, and display each still image in each section of the screen. When an input for searching for an object is received, the controller 212 can also automatically detect objects within the video, assign different numbers to the detected objects according to the size of the detected objects, and display the corresponding information.

Also, when a particular area of the still image is selected through a touch screen or a direction key, the controller 212 determines the selected area as the object. When an input for searching for an object is received, the controller 212 can capture the video to display a still image of the video on the display unit 201, and when an object within the still image is selected, the controller 212 can display information regarding the selected object, summary information of the video, and the selected object on the display unit 201.

The controller 212 also reproduces the video on a first area of the display unit 201, and when an input for searching for an object is received, detects an object included in the video in real time and displays the detected object and information regarding the detected object on a second area of the display unit 201. In addition, the information providing apparatus further includes a wireless communication unit (e.g., a CDMA module) 206 for transmitting the detected object to a server via a communication network and receiving information regarding the detected object from the server.

The information providing apparatus according to an embodiment of the present invention will now be described with reference to FIG. 5. Further, the information providing apparatus according to embodiments of the present invention is applicable to various terminals such as a smart phone, a notebook computer, a personal digital assistant (PDA), a portable multimedia player (PMP) as well as to the mobile communication terminal 100 and the telematics terminal 200.

Figure 5:
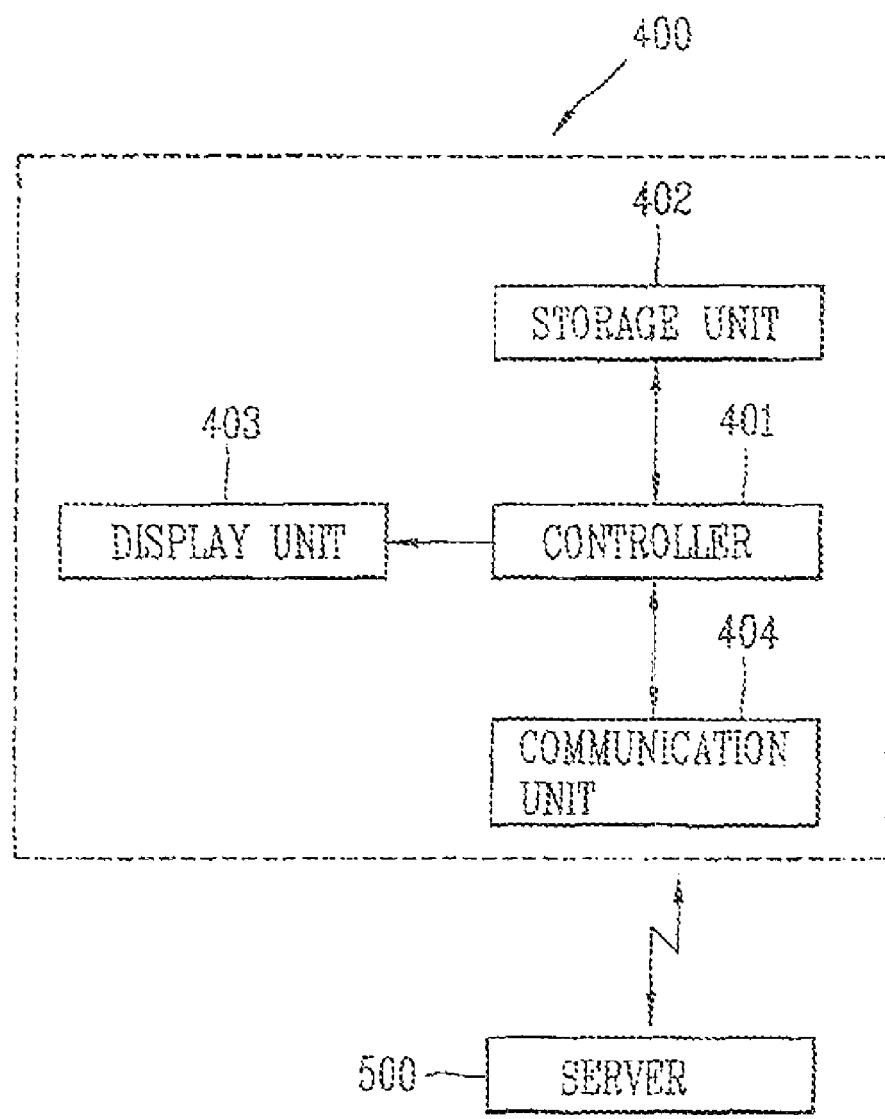
FIG. 5 is a block diagram of an information providing apparatus according to an embodiment of the present invention.

Next, FIG. 5 is a block diagram of an information providing apparatus 400 according to an embodiment of the present invention. As shown in FIG. 5, the information providing apparatus 400 includes a display unit 403 configured to display video and a controller 401 configured to detect an object within the video and provide information regarding the detected object. The controller 401 also displays history information of objects within the video on the display unit 403. The object also refers to an image, area selected from displayed video.

In addition, the object history information includes a video reproduction time bar, summary information regarding the video, a reproduction (display) time point of the detected object, etc. The object history information also includes the detected object. Further, the controller 401 displays an icon indicating a reproduction time point of the detected object at the video reproduction time bar. Also, when an input for searching for an object is received, the controller 401 captures the video, displays a still image of the video on the display unit 403, detects an object within the still image, and displays information regarding the detected object on the display unit 403.

In one embodiment, when an input for searching for an object is received, the controller 401 automatically detects objects within the video, assigns different numbers to the detected objects according to the size of the detected objects, and displays the same. When a particular area of the still image is selected through a touch screen or a direction key, the controller 401 determines the selected area as the object. The controller 401 also transmits the detected object to a communication unit 404, and the communication unit 404 transits the detected object to a server 500 via a communication network, receives information regarding the detected object from the server 500, and outputs the received information regarding the object to the controller 401.

When an input for searching for an object is received, the controller 401 captures the video, displays a still image of the video on the display unit 403, and when an object within the still image is selected, the controller 401 displays information regarding the selected object, summary information of the video, and the selected object on the display unit 403. The storage unit 402 also stores the video, the object, and information regarding the object. The controller 401 also recognizes a motion within the video, captures one or more still images according to the recognized motion and displays the one or more captured still images on the display unit 403.

The controller 212 also recognizes a motion within the video, captures a plurality of still images according to the recognized motion, divides the screen image of the display unit 403 into a plurality of sections, and displays each still image in each section of the screen. Further, the controller 212 reproduces the video on a first area of the display unit 403, and when an input for searching for an object is received, the controller 401 can detect an object included in the video in real time and display the detected object and information regarding the detected object on a second area of the display unit 403.

Figure 6:
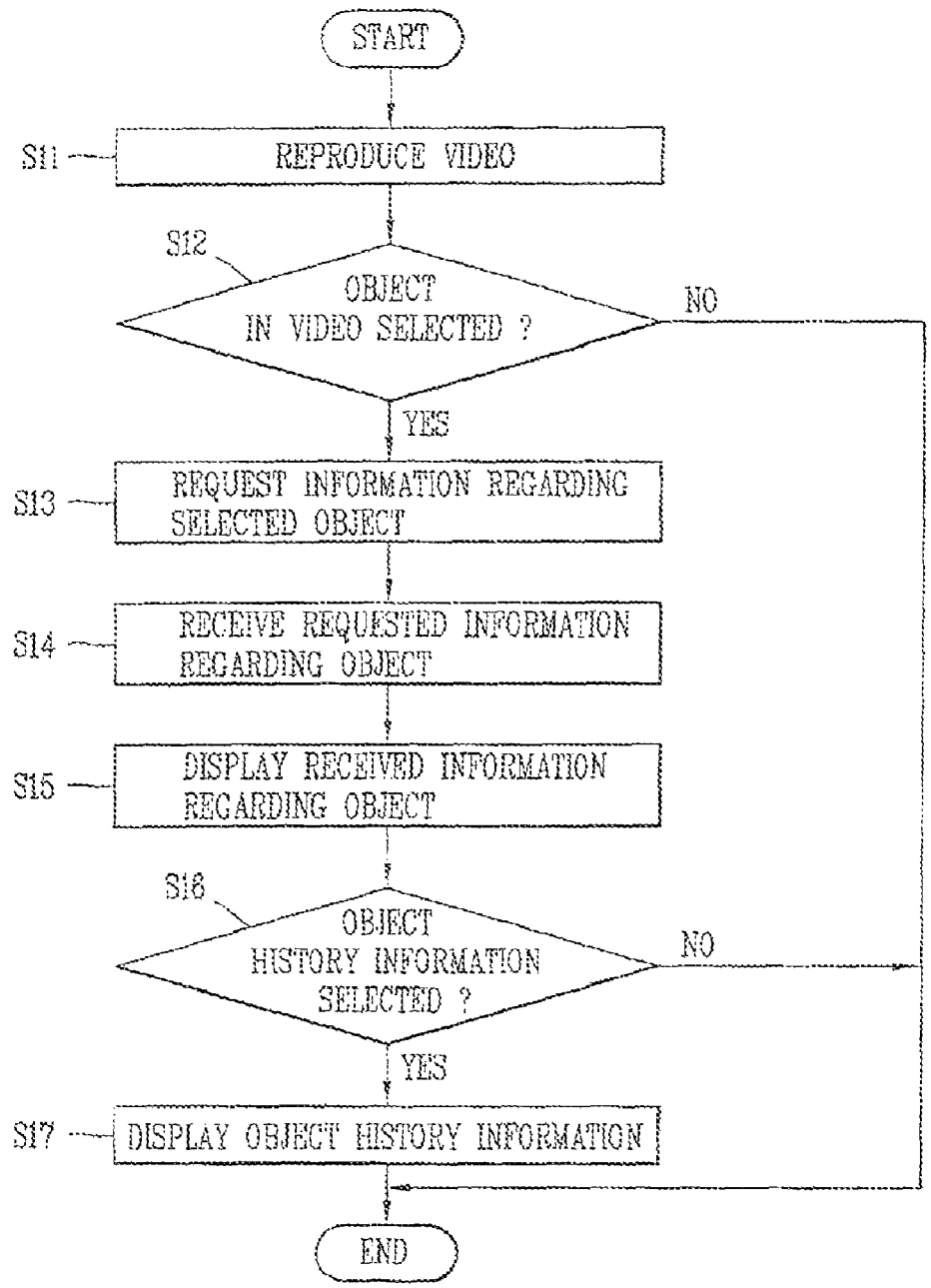
FIG. 6 is a flow chart illustrating an information, providing method according to a first embodiment of the present invention.

An information providing method according to a first embodiment of the present invention will now be described with reference to the flow chart in FIG. 6. FIG. 5 will also be referred to throughout the rest of the description of the present invention. As shown in FIG. 6, the controller 401 displays/reproduces a video selected by the user on the display unit 403 (S11). For example, the controller 401 can search a hard disk drive (HDD), a universal serial bus (USB), a disk, a digital living network alliance (DLNA), a common Internet file system (CIFS), an online server, etc. for the movie selected by the user, and then display the searched movie data on the display unit 403.

The controller 401 also determines whether or not an object within the video has been selected (S12). The object may be selected by a user or may be automatically selected by the controller 401. In more detail, when an input for searching for an object is received (e.g., when a key for searching for an object is selected by the user), the controller 401 captures the video, displays a still image of the video on the display unit 403 and determines an image area selected from the still image as an object.

Figure 7:
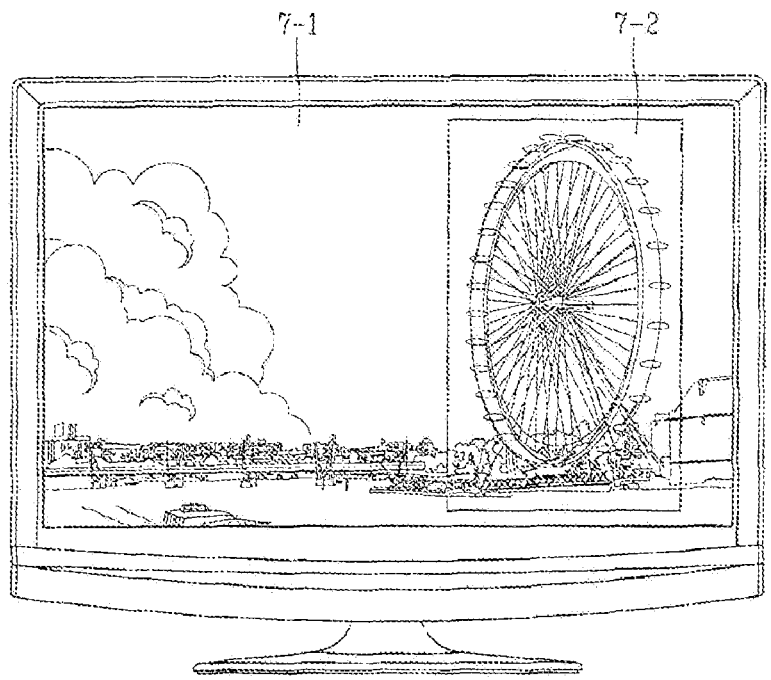
FIG. 7 is an overview of a display screen illustrating a still image according to the first embodiment, of the present invention.

In more detail, FIG. 7 is an overview of a display screen illustrating a still image according to the first embodiment of the present invention. As shown in FIG. 7, when an input for searching for an object is received (e.g., when a key for searching for an object is selected by the user), the controller 401 automatically captures the video, displays a still image 7-1 of the video on the display unit 403, and determines an image area (selected area) 7-2 selected from the still image 7-1 as an object. Here, the object may be a character photo image (e.g., talent, model, actor, etc.), a bridge or building photo image, a building photo image, a book jacket image, a label of wine, various product photo images, and the like.

The controller 401 can also determine whether or not the particular area 7-2 within the still image 7-1 is selected by the user. For example, after the center of the object is selected by the user and a right direction key of a remote controller is selected, the controller 401 can expand the selected area 702 horizontally, and when a left direction key of the remote controller is selected, the controller 401 can reduce the selected area 7-2 horizontally. Also, when an upper direction key of the remote controller is selected, the controller 401 can expand the selected area 7-2 vertically, and when a lower direction key is selected, the controller 401 can reduce the selected area 7-2 vertically. Accordingly, the user can select a desired area as an object through the direction keys of the remote controller. In addition, when a particular area of the still image is dragged through a touch screen by the user, the controller 401 can determine the dragged particular area as an object.

In addition, when an input for searching for an object is received (e.g., when a key for searching for an object is selected by the user), the controller 401 can automatically capture the video, display the still image 7-1 of the video on the display unit 403, and automatically detect objects from the still image 7-1. For example, the controller 401 can detect the objects from the still image through an object recognition program. In this instance, the controller 401 can assign different numbers to the detected objects according to the size of the detected objects, and display the corresponding information.

Figure 8:
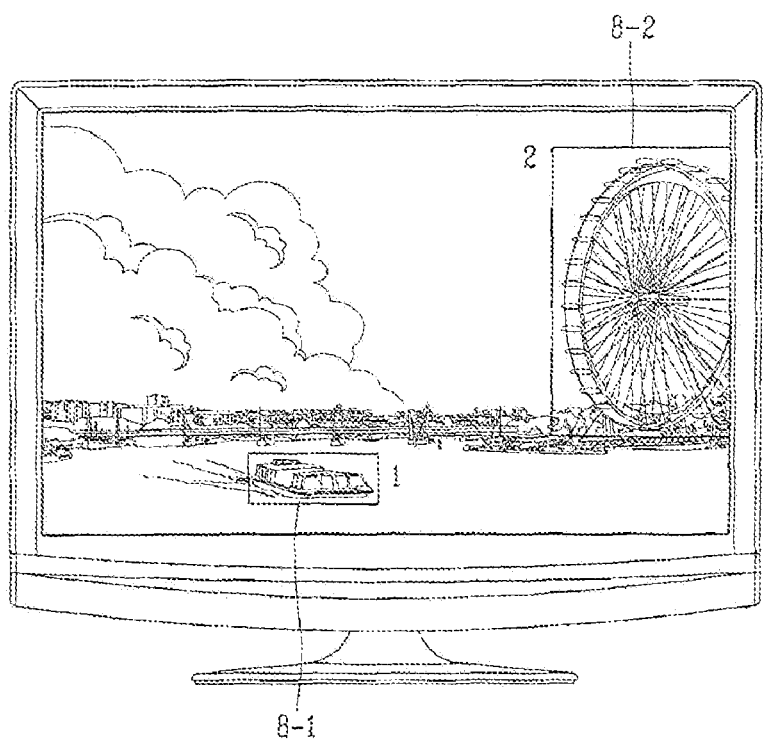
FIG. 8 is an overview of a display screen illustrating objects automatically detected from the still image according to the first embodiment of the present invention.

Next, FIG. 8 is an overview of a display screen illustrating objects automatically detected from the still image according to the first embodiment of the present invention. As shown in FIG. 8, when an input for-searching for an object is received (e.g., when a key for searching for an object is selected by the user), the controller 401 automatically captures the video, displays a still image of the video on the display unit 403, and automatically detects objects 8-1 and 8-2 within the still image.

Also, the controller 401 can assign different numbers to the detected objects 8-1 and 8-2 according to the size of the detected objects 8-1 and 8-2, and display the same. For example, the controller 401 can assign No. 1 to the object 8-1 having a smaller size, among the detected objects 8-1 and 8-2 and display the same, and assign No. 2 to the object 8-2 having a larger size and display the same, whereby the user can select an object by selecting a desired number.

Then, again referring to FIG. 6, when the object is selected, the controller 401 requests information regarding the selected object from the server 500 via the communication unit 404 (S13). For example, the communication unit 404 is connected to the server 500 via a wireline communication network or a wireless communication network under the control of the controller 401, and transmit the object to the server 500.

The server 500 then searches for information related to the object through the same image (photo image) as the transmitted object and transmits the searched information to the communication unit 404 via the communication network. For example, the server 500 interprets the features of a photo image (e.g., character photo image (e.g., talent, model, actor, etc.), a bridge or building photo image, a building photo image, a book jacket image, a label of wine, etc.), searches data having common characteristics, and provides the searched information.

The communication unit 404 also receives information related to the object from the server 500, and outputs the received information related to the object to the controller 401. The controller 401 then displays the information related to the object on the display unit 403 (S15). For example, when an object within the still image is selected, the controller 401 displays the information regarding the selected object, summary information of the video, and the selected object on the display unit 403.

Figure 9:
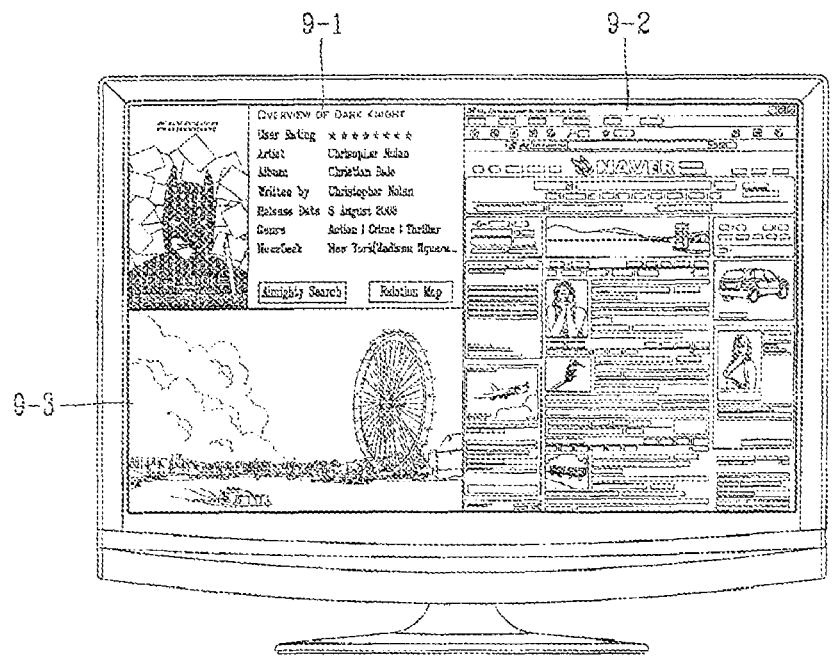
FIG. 9 is an overview of a display screen illustrating information regarding an object displayed on a display unit according to the first embodiment of the present invention.

Next, FIG. 9 is an overview of a display screen illustrating information regarding an object displayed on a display unit according to the first embodiment of the present invention. As shown in FIG. 9, when an object of the still image is selected, the controller 401 displays information, 9-2 regarding the selected object, summary information 9-1 of the video, and the selected object 9-3 on the display unit 403. When the video is 'Dark Night', the controller 401 reads summary information of the 'Dark Night' from the storage unit 402 and displays the read summary information on the display unit 403.

Further, the summary information may include a representative (poster) image of 'Dark Night', director information of the movie 'Dark Night', 'actor information (profile of an actor, his main work, etc.), writer/author information, release date information, genre information, award information, news desk, and the like. The summary information may further include a search icon for searching for data related to the movie. When the selected object is 'London Eye', the controller 401 receives various information 9-2 such as a production year of 'London Eye', the size of 'London Eye', and available time of 'London Eye' from the server 500 or reads the information from the storage unit 402, and displays the received or read information on the display unit 403.

Also, when the object within the still image is selected, the controller 401 can store a preset number of previous image frames (e.g., three previous image frames) and a pre-set number of future image frames (e.g., three future image frames) based on the still image in the storage unit 402 and display the same on the display unit 403 according to a user request. With reference to FIG. 6, the controller 401 also determines whether or not the object history information has been selected by the user (S16). For example, the controller 401 determines whether or not a key for checking the object history information has been selected by the user in order to check the object history information. When the key for checking the object history information is selected (Yes in S16), the controller 401 displays the object history information on the display unit 403 (S17).

Figure 10:
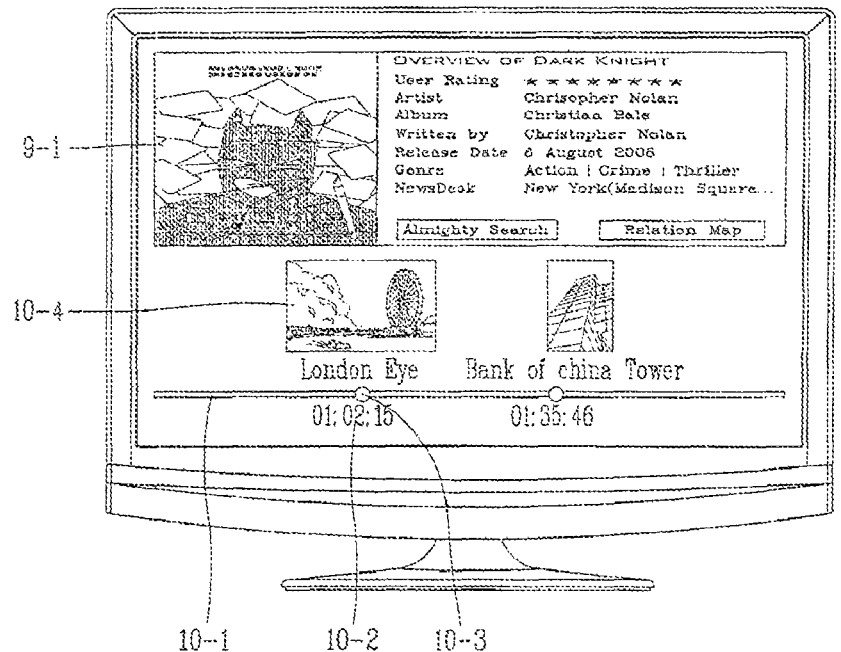
FIG. 10 is an overview of a display screen illustrating history information of an object displayed on the display unit according to the first embodiment of the present invention.

Next, FIG. 10 is an overview of a display screen illustrating history information of an object displayed on the display unit according to the first embodiment of the present invention. As shown in FIG. 10, when the key for checking the object history information is selected, the controller 401 displays the object history information including a video reproduction time bar 10-1, summary information 9-1 regarding the video, and a reproduction (display) time (a time point the video has passed one hour two minutes and fifteen seconds) 10-2 on the display unit 403. The object history information May also include a detected object 10-4. The controller 401 then displays an icon 10-3 indicating the reproduction time 10-2 of the detected object 10-4 at the video reproduction time bar 10-1.

An information providing method according to a second embodiment will now be described with reference to the flow chart of FIG. 11. As shown, the controller 401 displays/reproduces a video selected by the user on the display unit 403 (S21). The controller 401 then determines whether or not a key for searching for the object is selected by the user while the video is being reproduced (S22). When the key for searching for the object is selected by the user (Yes in S22), the controller 401 recognizes a motion of the video (S23), captures a predetermined number of still images (e.g., four still images) of the video based on the recognized motion value and displays one or more of the still images of the video on the display unit 403 (S24).

For example, if the video has significant motion, the controller. 401 acquires two, tour or eight past still images and two, four or eight future still images based on a time point at which the key for searching for the object was selected by the user, and displays the acquired still images on the display unit 403. In this instance, the controller 401 divides the screen into sections according to the number of the still images which have been acquired according to the motions of the video, and displays the respective still images on the respective sections of the screen. Further, the number of still images according to the motion of the video may be variably set according to the intention of the designer. The method of detecting a motion of the video is known, and thus a detailed description is omitted.

Figure 12:
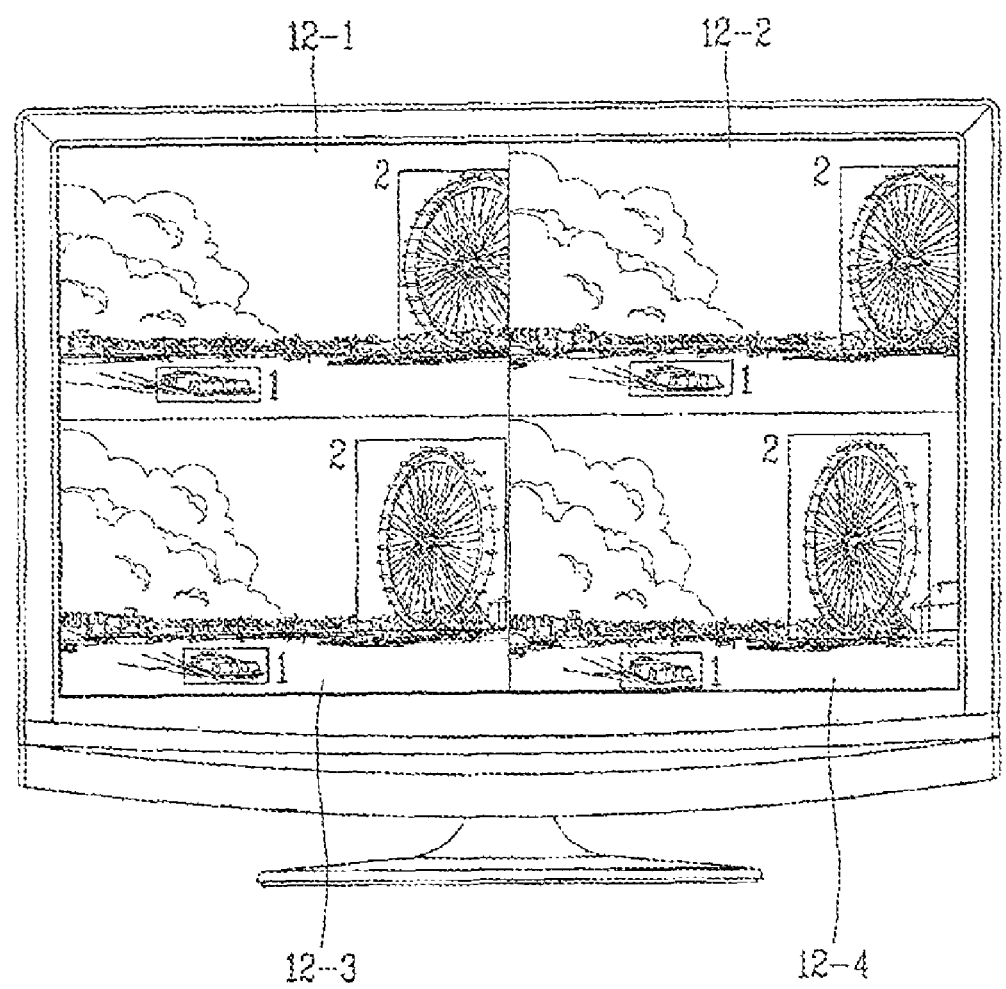
FIG. 12 is an overview of a display screen illustrating still images displayed on the display unit according to the second embodiment of the present invention.

In addition, FIG. 12 is an overview of a display screen illustrating still images displayed on the display unit 403 according to the second embodiment of the present invention. As shown in FIG. 12, when the video includes a great deal of motion, the controller 401 acquires one past still image 12-1 and two future still images 12-3 and 12-4 based on a still image 12-2 corresponding to a time point at which the key for searching for the object is selected by the user, and displays the acquired still images 12-1 to 12-4 on the display unit 403.

The controller 401 also divides the screen into four sections according to the number of still images which have been acquired according to the motions of the video, and displays the respective still images on the sections of the screen. The controller 401 also automatically detects the objects within the still images 12-1 to 12-4. Further, the controller 401 assigns different numbers to the detected objects according to the size of the detected objects and displays the same.

Figure 11:
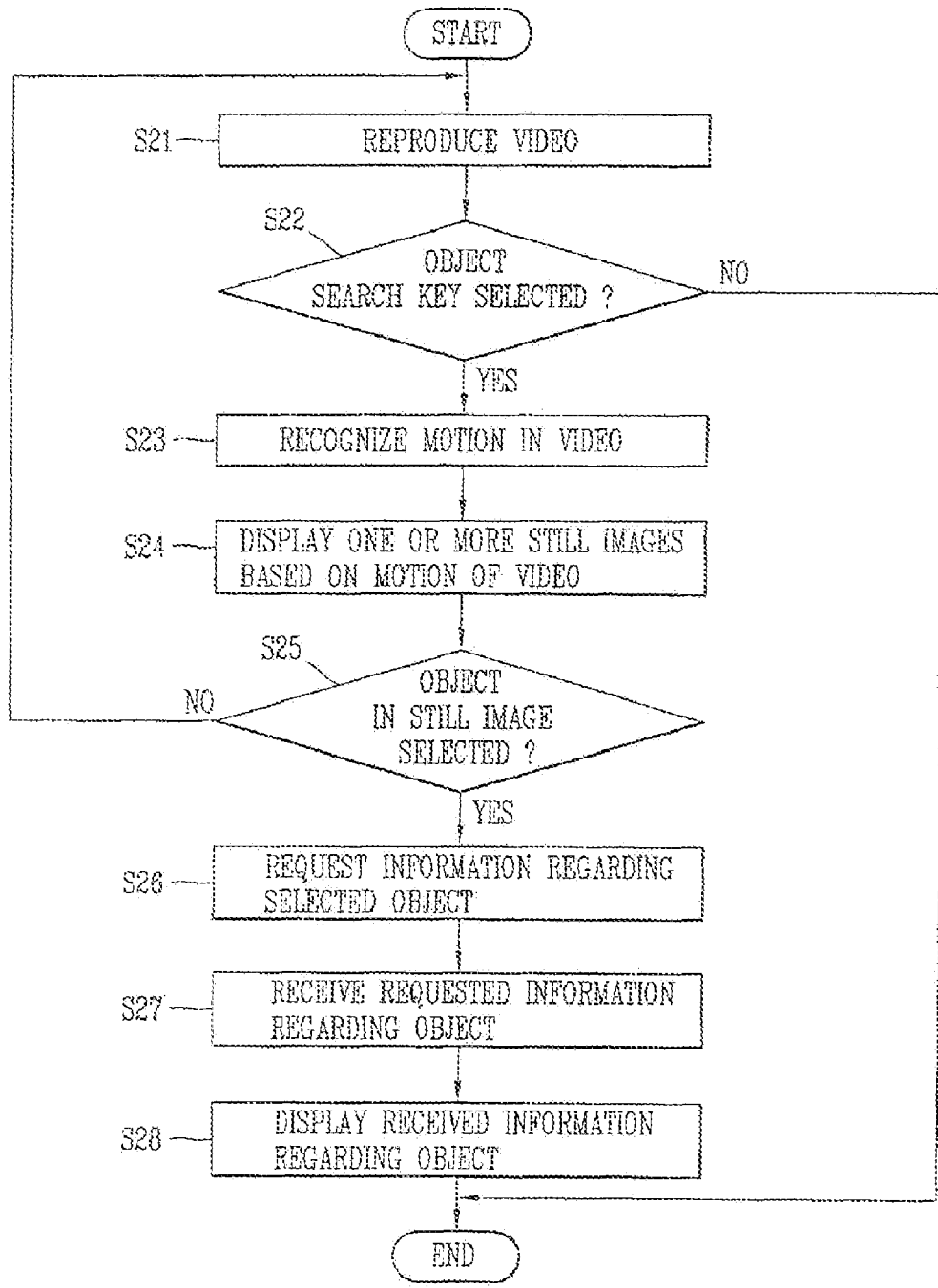
FIG. 11 is a flow chart illustrating an information providing method according to a second embodiment of the present invention.

Then, with reference to FIG. 11, the controller 401 determines whether or not a particular object is selected by the user from among the displayed objects (S25). When a particular object is selected (Yes in S25), the controller 401 requests information regarding the selected object from the server 500 via the communication unit 404 (826). For example, and as discussed above, the communication unit is connected to the server 500 via a wireline communication network or a wireless communication network under the control of the controller 401 and transmits the particular object to the server 500.

The server 500 then searches for the information related to the object through the same image (photo image) as that of the transmitted object, and transmits the searched information to the communication unit 404 via the communication network. For example, the server 500 interprets the features of a photo image (e.g., character photo image (e.g., talent model, actor, etc.), a bridge or building photo image, a building photo image, a book jacket image, a label of wine, etc.), searches data having common characteristics, and provides the searched information.

The communication unit 404 then receives information related to the object from the server 500 (S27), and outputs the received information related to the object to the controller 401. The controller 401 then displays the information related to the object on the display Unit 403 (S28). For example, when an object within the still image is selected, the controller 401 displays the information regarding the selected object, summary information of the video, and the selected object on the display unit 403.

Figure 13:
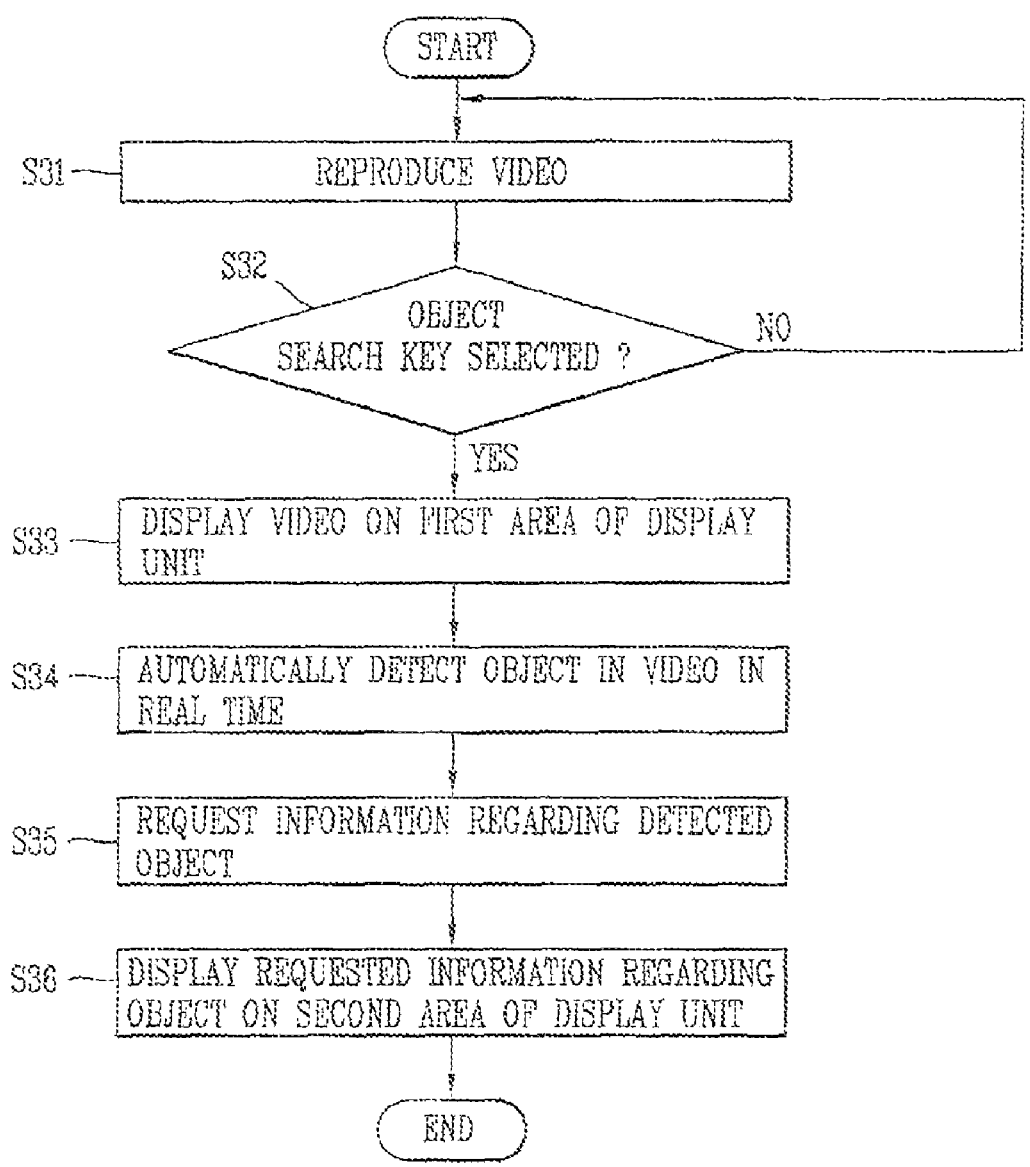
FIG. 13 is a flow chart illustrating an information providing method according to a third embodiment of the present invention.

An information providing method according to a third embodiment of the present invention will now be described with reference to the flow chart in FIG. 13. As shown the controller 401 displays/reproduces a video selected by the user on the display unit 403 (S31). The controller 401 also determines whether or not a key for searching for the object is selected by the user while the video is being reproduced (S32). When a key for searching for an object is selected by the user (Yes in S32), the controller 401 reproduces the video on a first area of the display unit 403 (e.g., at an upper end region of the display unit) (S33).

The controller 401 then automatically detects objects within the video in real time (S34). Further, the objects within the video may be previously set in video data, and information regarding each object may be included in the video data. The controller 401 also requests information regarding the detected object from the server 500 via the communication unit 404 or extract information regarding the detected object from the video data (S35). For example, and as discussed above, the communication unit 404 is connected to the server 500 via a wireline communication network or a wireless communication network under the control of the controller 401 and transmits the information regarding the object to the server 500 in real time. The server 500 then searches information regarding the object in real time through the same image (photo image) as that of the transmitted object and transmits the searched information to the communication unit 404 via the communication network.

The communication unit 404 also receives the information related to the object from the server 500 and outputs the received information related to the object to the controller 401. The controller 401 then displays the information related to the object on a second area of the display unit 403 (e.g., a lower end portion of the display unit) in real time (S36).

Further, in the information providing apparatus and method according to the embodiments of the present invention, while video is being reproduced, background music within the video being reproduced can be recognized and information regarding the recognized background music can be provided to the user. Namely, the controller 401 extracts pulse code modulation (PCM) data from the video data being reproduced, recognizes the background music based on the extracted PCM data, requests and receives information regarding the recognized background music from the server, and displays the received information regarding the background music on the display unit 403.

Also, to recognize the background music from the video data, various methods may be used. For example, the controller 401 can extract PCM data from the video data being reproduced and determines whether or not currently reproduced data is music data based on the extracted PCM data. If the currently reproduced data is music data, the controller 401 can directly transmit PCM data corresponding to the music data to the server, or to minimize a data capacity of the PCM data, the controller 401 can generate an audio (music) fingerprint (musical ID) for a music recognition based on the PCM data, transmits the audio fingerprint to a server (e.g., Gracenote database), receives music information matched to the PCM data or music information matched to the audio fingerprint from the server, and display the received music information on the display unit 151.

In addition, to recognize music based on the audio fingerprint, various application programs may be used. The audio fingerprint is information for easily recognizing music in the server (e.g., the Gracenote database). The server can also search for music information (e.g., the name of a singer, the name of an album, music purchase site information, etc.) matched to the music data based on the PCM data corresponding to the music data. One method for determining whether or not currently reproduced data is music data based on the PCM data is disclosed in Korean Patent Application No. 10-2007-0132215 and 10-2008-0010032, which are incorporated by reference in their entirety.

The controller 401 can also determine whether or not the currently reproduced data is music data based on the PCM data, or in an alternative embodiment, when a frequency higher than a, pre-set frequency value among the frequencies of the currently reproduced video is continuously generated for a pre-set time period (e.g., more than 10 seconds), the controller 401 can determine the continuously generated frequency as music data. The user can also select a preset key on the input unit that is designated for extracting information about the music being played in the current video (e.g., a music short or hot key on the terminal).

In addition, in an alternative embodiment, the controller 401 examines metadata associated with the video, generates the detection request signal based on object information about objects included in the metadata, and automatically detects a corresponding object in the video without user intervention when the corresponding object is identified in the metadata and is displayed on the video.

In another embodiment, the controller 401 searches metadata associated with the video for the input object, and automatically detects the input object in the video without user intervention when the input object is identified in the metadata and is displayed on the video. For example, in a movie starring the actor Chevy Chase, the user can input a request to retrieve information about Chevy Chase whenever he is acting in the Movie. The object history information can be a video reproduction time bar, summary information regarding the object (e.g., Chevy Chase), and a reproduction time point of the object indicating when the object is displayed in the video. The object information can also include summary information such as an age of Chevy Chase, how much money he made in that particular film, an address of his website, additional products to buy concerning Chevy Chase, etc. The additional information can also be displayed in a separate Window.

As so far described, the information providing apparatus and method according to the embodiments of thee present invention provide several advantages. That is, as video is displayed on a display unit, an object of the video can be detected, and information regarding the detected object is provided, so the user can easily select the object in the video. In addition, video is displayed on the display unit, an object in the video is detected, and information regarding the detected object is displayed, so the user can intuitively cheek information related to the object.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a communication unit configured to communicate with an external server associated with the mobile terminal;
a display unit configured to display a video; and a controller configured to receive a detection request signal requesting an object within an image of the video be detected, to detect the object upon receiving the detection request signal, to assign information to the detected object, to retrieve history timing information about when the object was detected, and to display the history timing information on the display unit, wherein upon receiving the detection request signal, the controller is further configured to detect a plurality of objects within the image of the video, to display the detected objects on the display unit, and to assign different numbers to the detected objects according to a size of the detected objects.

2. The mobile terminal of claim 1, wherein the controller is further configured to examine metadata associated with the video, to generate the detection request signal based on object information about objects included in the metadata, and automatically detect a corresponding object without user intervention when the corresponding object is identified in the metadata and is displayed in the video.

3. The mobile terminal of claim 1, wherein the detection request signal is manually entered by a user.

4. The mobile terminal of claim 1, wherein the controller is further configured to detect the object by examining still pictures or frames corresponding to a timing point of the video around when the detection request signal was received.

5. The mobile terminal of claim 1, wherein the object history information includes at least one of a video reproduction time bar, summary information regarding the video, and a reproduction time point of the object indicating when the object is displayed in the video.

6. The mobile terminal of claim 5, wherein the object history information further includes a thumbnail image of the detected object.

7. The mobile terminal of claim 5, wherein the controller is further configured to display an icon indicating the reproduction time point of the object on the video reproduction time bar.

8. The mobile terminal of claim 1, further comprising:
an input unit configured to receive an input object to be detected within an image of the video,
wherein the controller is further configured to search metadata associated with the video for the input object, and automatically detect the input object without user intervention when the input object is identified in the metadata and is displayed in the video.

9. The mobile terminal of claim 1, wherein upon receiving the detecting signal, the controller is further configured to detect a plurality of objects within an image of the video and to display pictures of the detected objects on the display unit.

10. The mobile terminal of claim 9, wherein upon receiving the selection signal requesting additional information be provided about a selected object among the plurality of objects, the controller is further configured to display history information about the selected object on the display unit.

11. The mobile terminal of claim 1, wherein the controller is further configured to control the communication unit to transmit the detected object to the external server and to receive the additional information about the detected object from the communication unit.

12. The mobile terminal of claim 1, wherein, while the video is being reproduced, the controller is further configured to recognize background music in the video being reproduced and to provide history timing information regarding the recognized background music.

13. A method of controlling a mobile terminal, the method comprising:
communicating, via a communication unit, with an external server associated with the mobile terminal;
displaying, via a display unit, a video;
receiving, via a controller, a detection request signal requesting an object within an image of the video be detected;
detecting, via the controller, the object upon receiving the detection request signal, assigning information to the detected object, and retrieving history timing information about when the object was detected, wherein upon receiving the detection request signal, the controller is further configured to detect a plurality of objects within the image of the video, to display the detected objects on the display unit, and to assign different numbers to the detected objects according to a size of the detected objects; and
displaying, via the controller, the history timing information on the display unit.

14. The method of claim 13, further comprising:
examining metadata associated with the video;
generating the detection request signal based on object information about objects included in the metadata; and
automatically detecting a corresponding object within an image of the video without user intervention when the corresponding object is identified in the metadata and is displayed on the video.

15. The method of claim 13, wherein the detection request signal is manually entered by a user.

16. The method of claim 13, further comprising:
detecting the object within an image of the video by examining still pictures or frames corresponding to a timing point of the video around when the detection request signal was received.

17. The method of claim 13, wherein the object history information includes at least one of a video reproduction time bar, summary information regarding the video, and a reproduction time point of the object indicating when the object is displayed in the video, and wherein the object history information further includes a thumbnail image of the detected object.

18. The method of claim 13, further comprising:
receiving, via an input unit, an input object to be detected within an image of the video;
searching metadata associated with the video for the input object; and
automatically detecting the input object within an image of the video without user intervention when the input object is identified in the metadata and is displayed on the video.

19. The method of claim 13, wherein upon receiving the detecting signal, the method further comprises detecting a plurality of objects within an image of the video and to display pictures of the detected objects on the display unit, and
wherein upon receiving the selection signal requesting additional information be provided about a selected object among the plurality of objects, the method further comprises displaying history information about the selected object on the display unit.

20. The method of claim 13, wherein, while the video is being reproduced, the method further comprises recognizing background music in the video being reproduced and providing history timing information regarding the recognized background music.

21. An information providing apparatus, comprising:
a communication unit configured to communicate with an external server associated with the mobile terminal;
a display unit configured to display a video; and
a controller configured to receive a detection request signal requesting an object within an image of the video be detected, to detect the object in the video upon receiving the detection request signal, to assign an indicator to the detected object, to select the indicator-assigned object, to receive information associated with the selected object from the server via the communication unit, and to display the information and the object on the display unit, wherein upon receiving the detection request signal, the controller is further configured to detect a plurality of objects within the image of the video, to display the detected objects on the display unit, and to assign different numbers to the detected objects according to a size of the detected objects.

22. A method of providing information, the method comprising:
communicating, via a communication unit, with a server associated with the mobile terminal;
displaying, via a display unit, a video;
receiving, via a controller, a detection request signal requesting an object within an image of the video be detected;
detecting, via the controller, the object in the video upon receiving the detection request signal;
assigning an indicator to the detected object;
selecting the indicator-assigned object;
receiving information associated with the selected object from the server via the communication unit; and
displaying the information and the object on the display unit,
wherein upon receiving the detection request signal, the controller is further configured to detect a plurality of objects within the image of the video, to display the detected objects on the display unit, and to assign different numbers to the detected objects according to a size of the detected objects.

* * * * *